US012387362B2

(12) United States Patent
Palmer

(10) Patent No.: US 12,387,362 B2
(45) Date of Patent: Aug. 12, 2025

(54) MODELING PLANAR SURFACES USING DIRECT PLANE FITTING

(71) Applicant: LexisNexis Risk Solutions FL Inc., Boca Raton, FL (US)

(72) Inventor: Victor Palmer, Denver, CO (US)

(73) Assignee: LexisNexis Risk Solutions FL Inc., Boca Raton, FL (US)

(*) Notice: Subject to any disclaimer, the term of this patent is extended or adjusted under 35 U.S.C. 154(b) by 397 days.

(21) Appl. No.: 18/063,825

(22) Filed: Dec. 9, 2022

(65) Prior Publication Data

US 2023/0186508 A1 Jun. 15, 2023

Related U.S. Application Data

(60) Provisional application No. 63/288,310, filed on Dec. 10, 2021.

(51) Int. Cl.
*G06T 7/70* (2017.01)
*G06T 3/40* (2006.01)
*G06V 10/25* (2022.01)
*G06V 10/74* (2022.01)

(52) U.S. Cl.
CPC ............... *G06T 7/70* (2017.01); *G06T 3/40* (2013.01); *G06V 10/25* (2022.01); *G06V 10/761* (2022.01)

(58) Field of Classification Search
None
See application file for complete search history.

(56) References Cited

U.S. PATENT DOCUMENTS

| | | | | |
|---|---|---|---|---|
| 6,473,536 B1* | 10/2002 | Chiba | ..................... | G06T 11/00 382/284 |
| 6,990,228 B1* | 1/2006 | Wiles | ..................... | G06T 7/55 348/42 |
| 8,817,071 B2* | 8/2014 | Wang | ..................... | G06T 17/00 348/43 |
| 11,514,597 B1* | 11/2022 | Shen | ..................... | G05D 1/0094 |
| 2002/0024516 A1* | 2/2002 | Chen | ..................... | G06T 7/593 348/E13.016 |
| 2005/0163343 A1* | 7/2005 | Kakinami | ............ | G06V 20/586 382/103 |

(Continued)

*Primary Examiner* — Randolph I Chu
(74) *Attorney, Agent, or Firm* — TROUTMAN PEPPER LOCKE LLP; James E. Schutz; Mark Lehi Jones

(57) ABSTRACT

Embodiments of the disclosed technology are directed to using pixel data from two or images of the same real-world region to determine the orientation of substantially planar surfaces in those images. The disclosed technology may be utilized to generate positions and/or orientations of planar surfaces based on multiple 2D images of the planar surface. Implementations can include modeling a planar surface, which can include capturing at least two images (from corresponding different, known positions), determining, from the images, regions that correspond to substantially the same portion of the real-world planar surface, computing a similarity metric for the two regions, and then determining the orientation of the planar surface based on maximizing the similarity metric over various different regions from the images. The described embodiments provide improvements in speed and accuracy compared to existing procedures and are able to find planar surfaces in both low-texture environments and occluded environments.

20 Claims, 9 Drawing Sheets

(56) References Cited

U.S. PATENT DOCUMENTS

| | | | |
|---|---|---|---|
| 2008/0247668 A1* | 10/2008 | Li | G06T 7/593 382/285 |
| 2009/0010507 A1* | 1/2009 | Geng | G06T 7/593 382/128 |
| 2011/0090337 A1* | 4/2011 | Klomp | G01C 11/025 348/E7.085 |
| 2011/0176007 A1* | 7/2011 | Ding | H04N 9/3194 348/189 |
| 2012/0062702 A1* | 3/2012 | Jiang | G06T 19/006 348/46 |
| 2012/0127171 A1* | 5/2012 | Li | G06T 7/32 382/154 |
| 2014/0043329 A1* | 2/2014 | Wang | G06T 17/20 345/420 |
| 2015/0269723 A1* | 9/2015 | Karam | G06V 20/64 348/46 |
| 2015/0317821 A1* | 11/2015 | Ding | G06T 7/60 345/420 |
| 2016/0234473 A1* | 8/2016 | Choi | G06T 7/85 |
| 2016/0323565 A1* | 11/2016 | van Baarsen | H04N 9/8211 |
| 2018/0205963 A1* | 7/2018 | Matei | H04N 21/85406 |
| 2019/0244050 A1* | 8/2019 | Lin | G06V 10/17 |
| 2020/0364876 A1* | 11/2020 | Mohan | G06V 10/7753 |
| 2021/0342633 A1* | 11/2021 | Sung | G06T 7/97 |
| 2023/0052582 A1* | 2/2023 | Ma | G06F 18/22 |
| 2023/0128689 A1* | 4/2023 | Qian | G06V 10/753 382/289 |
| 2023/0186508 A1* | 6/2023 | Palmer | G06V 10/25 382/103 |
| 2025/0052593 A1* | 2/2025 | Long, II | G06T 7/579 |

\* cited by examiner

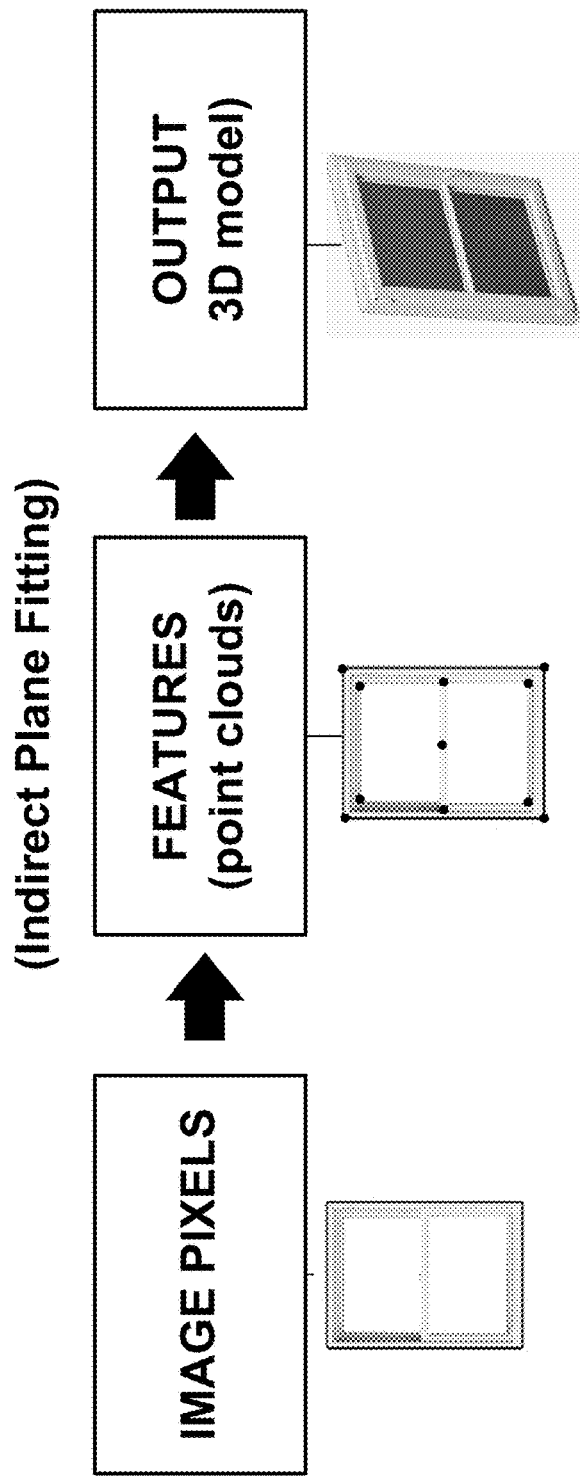
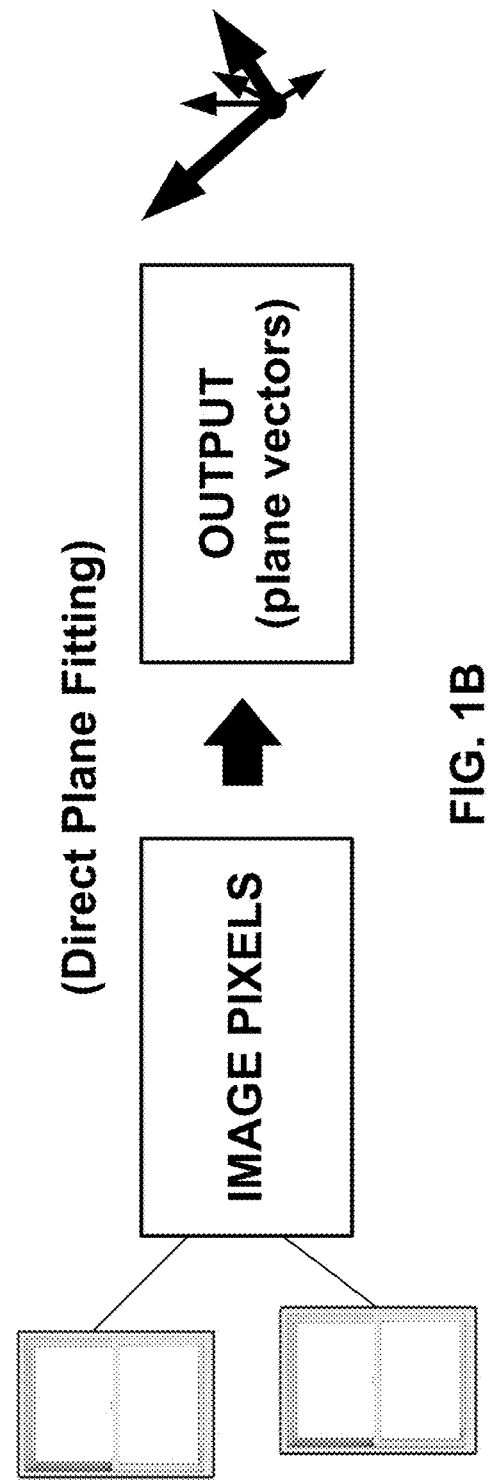
FIG. 1A
FIG. 1B

MODELING PLANAR SURFACES USING DIRECT PLANE FITTING

CROSS-REFERENCE TO RELATED APPLICATIONS

This application claims priority to U.S. Provisional Patent Application Ser. No. 63/288,310, filed on 10 Dec. 2021, entitled "Modeling Planar Surfaces Using Direct Plane Fitting," the contents of which are hereby incorporated by reference in their entirety as if presented herein in full.

BACKGROUND

Accurate digital representations of a physical structure (e.g., house, room, building, and the like) can be used to facilitate efficient construction, maintenance, renovation planning, documentation, etc. The ability to accurately and efficiently build a three-dimensional (3D) model of a structure based on two-dimensional (2D) images of the structure can further reduce costs associated with a variety of applications. When generating a 3D model of a room, for example, a typical goal is to derive mathematical representations of walls in terms of 3D world positions and orientations. However, one of the challenges associated with generating 3D models from 2D images of structures involves modeling planar surfaces.

As illustrated in FIG. 1A, a traditional method for deriving 3D information from 2D images is known as "indirect plane fitting," which typically involves extracting features (using point clouds) from image pixels and processing the features to derive an output (i.e., a 3D model). In general, such indirect methods utilize computer vision and algorithms to extract features from the pixels in an image, and the extracted features are again processed to produce the output representation or 3D model. The extracted features can include point clouds, line segments, or even deep network feature vectors.

The traditional indirect process may first extract a series of line segments from an image, and then cluster those line segments to find the vanishing points in an image. In such techniques, the data points may be averaged to find an average planar fit, determine the planar surface, and adjust the alignment to construct a 3D building plane position. Alternatively, random sample consensus may be used to generate a 3D proximity buffer that may be applied to the data points for the determination of the planar surface.

However, such indirect plane fitting methods can be slow and cumbersome due to the associated intensive computation requirements. Furthermore, such traditional indirect plane fitting methods can be inaccurate (or fail), particularly for low-texture structures and/or scenes having occluding objects (i.e., objects placed between the camera and the plane being imaged), which can disqualify cloud points that would otherwise be candidates for the point cloud generation. There is a need for a faster and more robust method for modeling planar surfaces.

BRIEF SUMMARY

Embodiments of the disclosed technology are directed to modeling surfaces using direct plane fitting. A method is provided for modeling a surface of interest using direct plane fitting to find planes. The method includes receiving two images of a surface of interest, each captured from different known positions. The method includes identifying, from the two images, common regions R1 and R2 of the surface of interest, the common regions corresponding to an area region R of the surface of interest. The method includes back-projecting the common regions R1 and R2 to the two images to produce homography-mapped images R1$w$ and R2$w$ from the two images, computing a 2-dimensional gradient of R1$w$ and R2$w$ to produce R1$wg$ and R2$wg$, locating, within the homography-mapped images R1$w$ and R2$w$, pairs of points that correspond to common positions on the surface of interest in each of the two images, projecting rays through the pairs of points from the different known positions to intersect at a world-point P, and using P as a seed, searching for candidate plane vectors that intersect P. The searching includes, for the candidate plane vectors that intersects P, computing a local plane coordinate system, determining a center C of the area region R of the surface of interest, for each possible plane orientation angle for the candidate plane vectors, and computing a similarity metric S. When the similarity metric S is greater than or equal to a predetermined threshold, the method includes outputting the candidate plane vectors and terminate the searching.

Another method for modeling a surface of interest. The method includes (a) capturing, from a plurality of different positions, a plurality of images of the surface of interest, (b) identifying a region in each of the plurality of images of the surface of interest, the regions corresponding to substantially the same portion of the surface of interest, (c) determining, within the regions, a pixel that corresponds to a common position on the surface of interest in each of the plurality of images, (d) selecting, based on a location of the pixel in the corresponding region, a candidate orientation of the surface of interest and computing a similarity metric for the candidate orientation, (e) determining whether the similarity metric is greater than a predetermined threshold, (f) repeating operations (c) through (e) until the similarity metric exceeds the predetermined threshold or a predetermined number of pixels has been processed, (g) repeating operations (b) through (f) until the similarity metric exceeds the predetermined threshold or a predetermined number of regions have been identified, and (h) determining, based on operations (b) through (f), an orientation of the surface of interest.

Certain implementations of the disclosed technology may be embodied in the form of a non-transitory computer-readable storage medium storing instructions that are configured to cause one or more processors to perform a method of (a) capturing, from a plurality of different positions, a plurality of images of the surface of interest, (b) identifying a region in each of the plurality of images of the surface of interest, the regions corresponding to substantially the same portion of the surface of interest, (c) determining, within the regions, a pixel that corresponds to a common position on the surface of interest in each of the plurality of images, (d) selecting, based on a location of the pixel in the corresponding region, a candidate orientation of the surface of interest and computing a similarity metric for the candidate orientation, (e) determining whether the similarity metric is greater than a predetermined threshold, (f) repeating operations (c) through (e) until the similarity metric exceeds the predetermined threshold or a predetermined number of pixels has been processed, (g) repeating operations (b) through (f) until the similarity metric exceeds the predetermined threshold or a predetermined number of regions have been identified, and (h) determining, based on operations (b) through (f), an orientation of the surface of interest.

Certain details of the disclosed technology will be explained below in the detailed descriptions with the aid of the following drawings.

BRIEF DESCRIPTION OF THE DRAWINGS

FIG. 1A depicts a traditional indirect plane fitting method including an intermediate process in which points are utilized to determine features, which are then used to produce an output.

FIG. 1B depicts a direct plane fitting method in which plane vectors may be determined from the image pixels without intermediate representation, in accordance with the disclosed technology.

DETAILED DESCRIPTION

Figure 2:
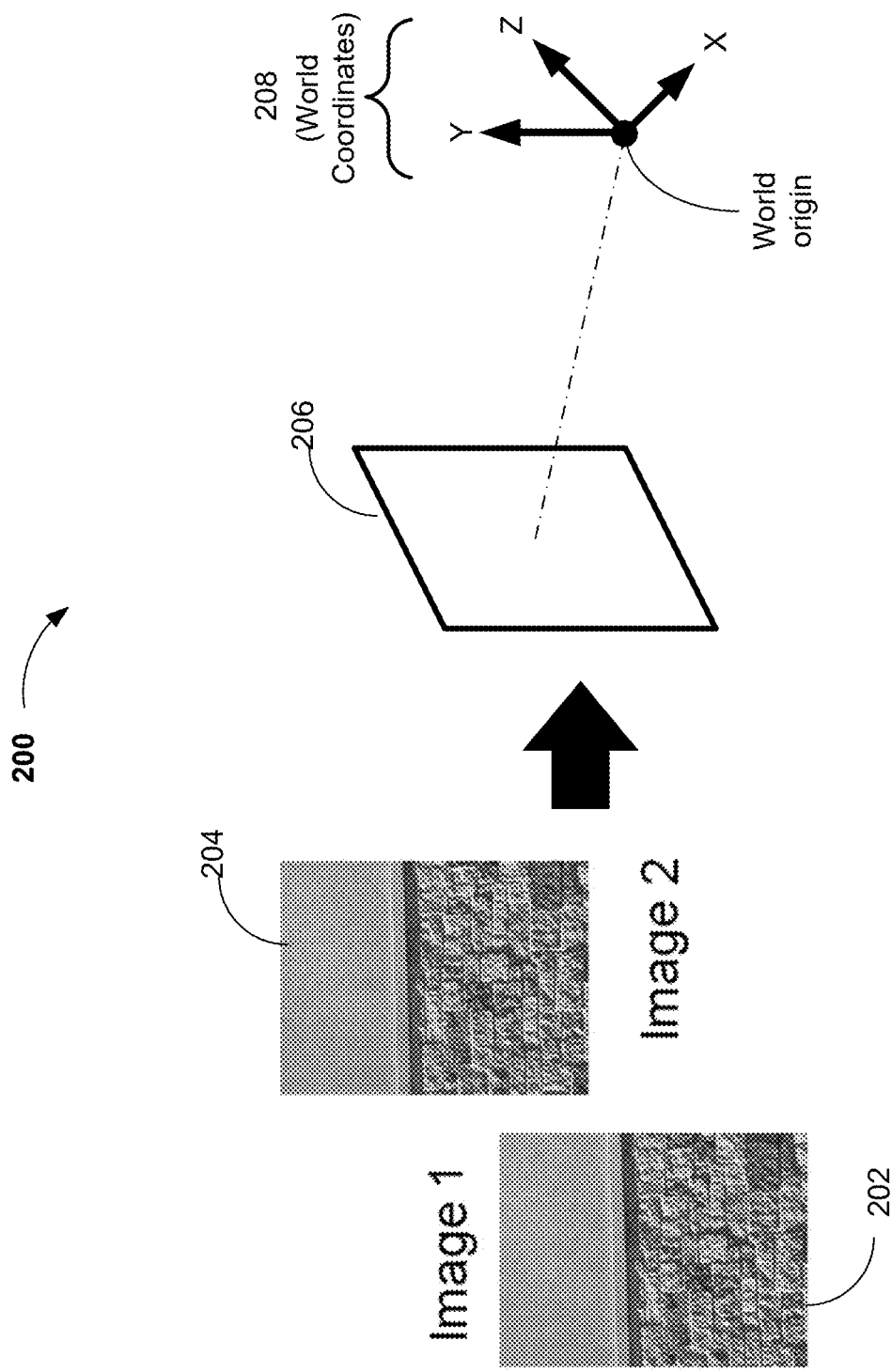
FIG. 2 depicts an implementation of the direct plane fitting method in which two images, each captured from different known locations, may be utilized to extract a mathematical description of an associated plane in 3D real-world coordinates, according to certain embodiments of the disclosed technology.

Planar surfaces are core features that are present in most physical structures including windows, walls, rooms, houses, buildings, and the like. One of the main goals associated with generating 3D models of such planar structures is to determine the position and orientation of planar surfaces in the physical structure. The disclosed technology provides an improved method for determining the position and orientation (i.e., output) of planar (or substantially planar) surfaces in a region of interest by analyzing associated camera images captured from different known positions.

As depicted in FIG. 1B, certain exemplary implementations of the disclosed technology may utilize direct plane fitting using at least two images of a region of interest, each image captured from different known locations, to determine a plane representation output from the image pixels without requiring intermediate feature extraction. In certain implementations, the output may be a vector representation N that uniquely describes a plane in the region of interest, as will be explained in detail below.

In accordance with certain exemplary implementations of the disclosed technology, described embodiments, the surface of interest may be any suitable surface (e.g., an exterior wall, an interior wall, the flat portion of a roof, and the like) that may be modeled. Certain implementations of the disclosed technology may be particularly suitable for planar (or substantially planar) surfaces. A substantially planar surface, for example, can be a planar surface with aberrations that may not affect the direct plane fitting methods described herein. For example, the flat surface of a roof is substantially planar because the planar portion of the roof can be detected despite the presence of shingles. In another example, a stucco wall is a substantially planar surface, which can also be detected despite the decorative coating that is typically present on stucco walls.

Certain exemplary implementations of the disclosed technology may be utilized to generate positions and/or orientations of planar surfaces based on multiple 2D images of the planar surface. An example method is disclosed herein for modeling a planar surface, which can include capturing at least two images (from corresponding different, known positions), determining, from the images, regions that correspond to substantially the same portion of the real-world planar surface, computing a similarity metric for the two regions, and then determining the orientation of the planar surface based on maximizing the similarity metric over different regions from the images.

Embodiments of the disclosed technology employ direct methods, which may provide distinct benefits over existing indirect methods, such as point-cloud-based approaches. Among the benefits of the disclosed technology, for example, is increased speed and/or accuracy. For example, the disclosed technology may utilize a similarity metric that may be computed over the raw pixels in an entire region of interest, and which may be computationally 10 to 1000 faster than indirect methods which utilize point clouds. In some instances, indirect methods which utilize point clouds may be computationally prohibitive.

Another benefit of the disclosed technology is that it can provide enhanced robustness over indirect methods when using images that include low textures. In some cases, the plane to be examined may not be amenable to point-based methods. Point features are generally only able to be identified at corners or intersections of lines. This can be problematic for structures that are line-rich but point-poor. The disclosed technology may be more robust for this type of scene.

Another benefit of the disclosed technology is that it can provide enhanced robustness over indirect methods when using images that include occlusions. For example, there are often objects (such as plants, small appliances, etc.,) disposed between the image capture device and the region of interest being imaged. When using indirect methods to construct a point cloud, for example, based on obstructed images, point matches can only be determined across two source images for points of interest that are present in both images. Because of occlusion and parallax effects, occluding objects can disqualify points that would otherwise be candidates for the point cloud generation. The disclosed technology may be more robust for this type of occlusion because, in certain implementations, only a single valid match may be needed to extract a plane vector from a scene.

FIG. 2 depicts an example of the disclosed technology in which multiple 2 dimensional (2D) images 202 204 of a surface of interest may be utilized to determine the position and orientation 206 of the surface of interest. In this example embodiment, the two images 202 204 of the same region may be captured from two different known positions in world coordinates 208 and the corresponding image pixels of the surface of interest may be used to model a plane's orientation and distance.

Figure 3B:
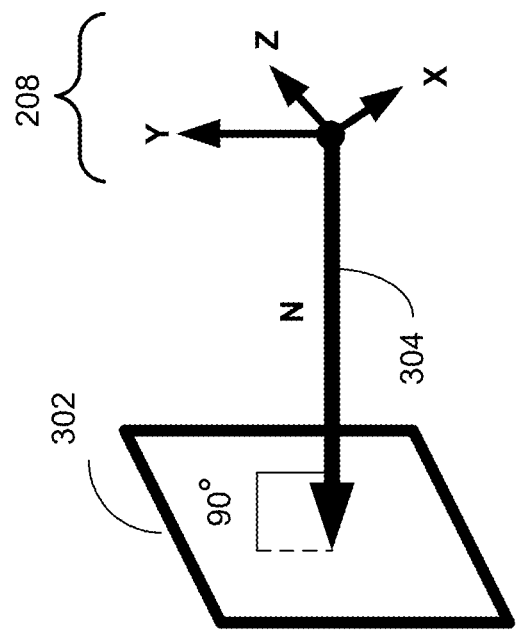
FIG. 3B depicts a 3D view of a plane vector N of a plane (as illustrated in FIG. 3A), in accordance with certain exemplary implementations of the disclosed technology.
Figure 3A:
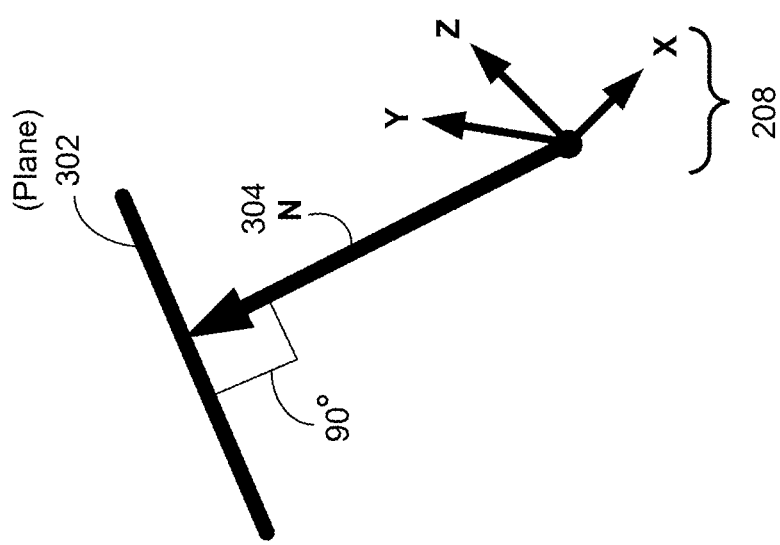
FIG. 3A depicts a top-view representation of a plane vector N corresponding to a plane, in accordance with certain exemplary implementations of the disclosed technology.

As depicted in FIG. 3A and FIG. 3B, a plane 302 may be modeled or represented by a 3D vector N 304 that is normal (perpendicular) to the plane 302. The vector N 304 may uniquely describe the plane 302 in terms of orientation and distance. In certain exemplary implementations, N 304 may start at the origin (in the world coordinate space 208) and may terminate at the point of nearest approach on the surface of the plane 302. However, N 304 may provide no information about the extent (width, height) of the plane 302.

When extent information is needed, there are additional techniques that can be utilized to discover the real-world extents of a plane. For example, to find the location of the corners of a rectangular building, infinite planes of the walls may be found, and corners may be identified by plane-plane intersections. To find plane extents in perspective photos, polygons may be drawn around the edges of the planes in the images to define the edges of single planar surfaces. However, such techniques generally depend on first having determined the plane's vector N 304.

In accordance with certain exemplary implementations of the disclosed technology, determining a plane's vector N 304 may be a precursor step to further downstream processing, including finding the plane's bounds, and relation to other planes in the scene.

Figure 4:
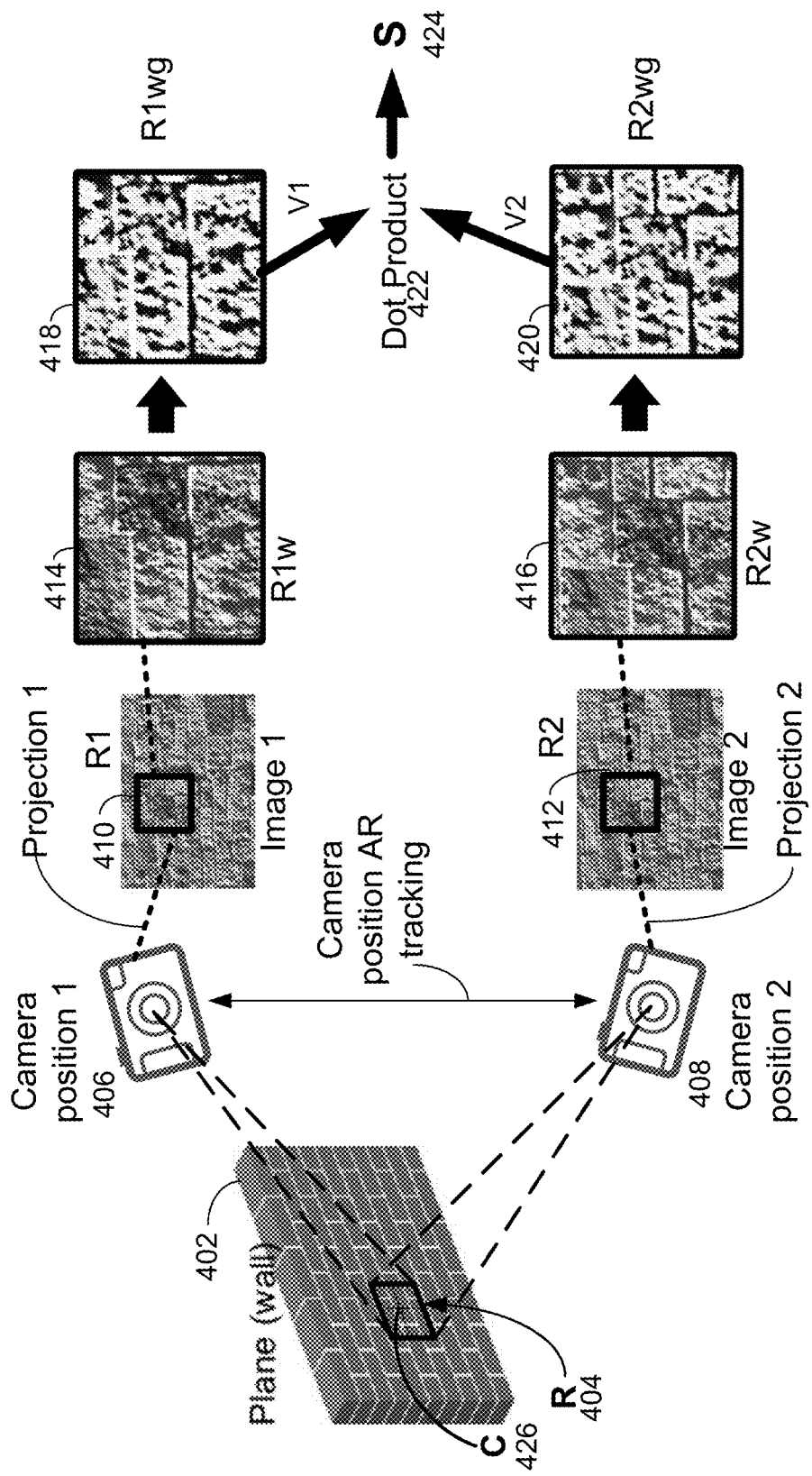
FIG. 4 depicts a process for direct plane fitting, in accordance with certain exemplary implementations of the disclosed technology.

FIG. 4 illustrates a process for direct plane fitting, in accordance with certain exemplary implementations of the disclosed technology. A region of interest R 404 of a plane 402 (a brick wall in this example) may be imaged by a camera at a first known position 406 and a second known position 408 to produce respective projection images R1 410 and R2 412. While certain implementations may use separate cameras, in practice these images could be taken with the same physical camera from different real-world locations. In certain exemplary implementations, the camera may be a mobile device camera on a user's smartphone.

Since Augmented Reality (AR) engines are widely available on modern mobile devices, certain implementations of the disclosed technology may utilize an AR engine to automatically capture relative positions and orientations (i.e., poses) of the camera in the world coordinate system while each of the images is captured. In situations where the AR system is not available, the relative pose of the cameras may be obtained by using any number of "relative pose from points" techniques. However, for certain implementations of the disclosed technology, the world coordinate capture positions and orientations of images are known or may be derived.

Given the camera positions and orientations, we can project any point on the plane 402 into the image space of the two camera positions 406 408. The mathematics to project a point from world space is discussed in Robert Collins CSE486 lecture 12, Penn State (http://www.cse.psu.edu/-rtc12/CSE486/lecture12.pdf) which is incorporated herein by reference as if presented in full. In certain exemplary implementations, such projection can be accomplished using the camera's view matrix and/or an intrinsic matrix provided by the AR engine, as discussed in the Apple Developer ARKit documentation (https://developer.apple.com/documentation/arkit/arcamera/2923538-projectpoint), which is incorporated herein by reference as if presented in full.

Referring again to FIG. 4, a region R 404 on the plane 402 may be projected into the image space of the two camera positions. In the case where R 404 is a square, and since there we four corner points for each of the regions (R 404 on the wall in world space, and R1 410 and R2 412 in image space), a homography may be computed to map pixels freely back and forth between corresponding patches R 404 of the wall surface and the camera images R1 410 and R2 412. The image pixels may also be back-projected from R1 410 and R2 412 from the image back to the single region R 404 on the surface of the wall. If R 404 is set to be a square aligned with the wall in world space, the results of this back-projection are two (approximately) square images R1$w$ 414 and R2$w$ 416 filled with homography-mapped image pixels from Image 1 and Image 2.

Since R1$w$ 414 and R2$w$ 416 both image the same real-world region R 404, both R1$w$ 414 and R2$w$ 416 should be pixel-wise very similar. If the surface is not specular (such that its appearance changes with observation angle), and if exposure settings are held constant, R1$w$ 414 and R2$w$ 416 should be pixel-wise nearly identical except for camera sensor noise.

One method for measuring the similarity between the two patches R1$w$ 414 and R2$w$ 416 (to test for a wall, for example) could be to consider each patch as one long vector and subtract the pixel intensity values (i.e., |R1$w$−R2$w$|), however, this may not work very well in practice since the exposure settings for the camera will likely change between the images.

In accordance with certain exemplary implementations of the disclosed technology, a preferred method to measure the similarity between the two patches R1$w$ 414 and R2$w$ 416 (and to also test for the existence of a wall) includes computing the gradient of the patches R1$w$ 414 and R2$w$ 416 in the X and Y directions to produce R1$wg$ 418 and R2$wg$ 420 before comparing them (via a dot product, as will be explained below). Even if the overall brightness of the patch changes, the corresponding gradient representations should be less affected.

In accordance with certain exemplary implementations of the disclosed technology, a 2-channel gradient image R1$wg$ 418 may be computed from R1$w$ 414 (one channel for each gradient direction). Similarly, a 2-channel gradient image R2$wg$ 420 may be computed from R2$w$ 416. If R1$w$ is an N×N image, after taking the gradient in the X and Y directions, the gradient image may have 2×N×N values that describe the patch. In accordance with certain exemplary implementations of the disclosed technology, R1$w$414 and R2$w$416 may be unrolled into two long, 2×N×N-component vectors V1 and V2. We can then compute their normalized dot project 422 to compute a similarity S 424:

$$S = (V1 \cdot V2)/(\sqrt{(V1 \cdot V1)} \times \sqrt{(V2 \cdot V2)}).$$

When V1 and V2 are identical, S 424 is 1, and S 424 is bounded between 1 and −1. Since V1 and V2 may be high-dimensional, their inner product drops quickly to zero when they are not similar. In certain exemplary implementations, when S 424 is greater than about 0.7, this may provide evidence to support that a plane exists with a plane vector N. In certain exemplary implementations, a threshold for S 424 may be set (for example 0.9) and we say that the wall existence test is passed (a plane has been found) when S 424 is above the threshold. In certain exemplary implementations, this threshold may be utilized as a metric to terminate a search for a plane, as will be discussed below.

The discussions above provide methods for testing whether a plane with vector N exists in an image. This may provide sufficient information for certain applications. However, in certain implementations, a goal of the disclosed technology may be to find planes that are present in image pairs and obtain their vectors so that a region of interest may be modeled. One approach that may be used is brute-force searching through a range of values for N (the plane vector) and R (the square region on the wall projected into the images) and performing the above-referenced plane existence test with each N, R combination. However, this is a high-dimensional search space since N has three degrees of freedom (plane orientation and distance from origin), and R has three degrees of freedom (2D location on the wall and size). An exhaustive search of the space is thus a 6-dimensional search problem, which can quickly become untenable. Certain implementations of the disclosed technology provide improved speedup operations which can help search this space more quickly and efficiently.

In general, a plane may be described has having a normal vector N may have a natural origin defined at the surface of the plane (which may be different than the world origin). Similarly, the plane may have a natural coordinate system (defined by gravity for example) which can also differ from the world coordinate system. In certain implementations, the plane's X-axis can be computed from the cross product between the world gravity down direction and the plane normal vector N. Similarly, the plane Y-axis can then be computed as the cross product between the plane X axis and the plane normal vector N. To specify a square region R 404 on the wall, we need only specify the center C 426 of the region in wall coordinates (Rx, Ry) and the width Rs.

Certain implementations of the disclosed technology may utilize ray tracing methods, as discussed in "An Introduction to Ray Tracing," Edited by Andrew S. Glassner, 1989, Academic Press Ltd., United Kingdom, the contents of which are incorporated herein by reference as if presented in full. In accordance with certain exemplary implementations of the disclosed technology, ray tracing, may be utilized to map points between planes, objects, vantage points, etc. Ray tracing, for example, may be utilized to map a view of a 3-dimensional object to a 2-dimensional image plane through a line of sight to a vantage point.

To illustrate a basic form of tray tracing, consider the ray tracing may be used to map a (3D) cube onto a (2D) image plane: lines may be projected from each corner of the cube to the vantage point of the camera. To map the cube's shape onto the image plane, points may be marked on the image plane where each projected line intersects with the surface of the image plane. The operation may be repeated for the remaining edges of the cube, resulting in a two-dimensional representation of the cube on the image plane. Such a process may be repeated for each object in a scene, resulting in a 2D image of the scene as it appears from a particular vantage point (such as the placement of the camera).

In certain ray tracing approaches, rays emanating from a source may be traced through their paths to the camera position. However, certain implementations may utilize backward ray tracing (also known as backtracing) as a way to improve the efficiency by tracing rays in the opposite direction, from the camera position to the objects in the scene. This method can provide a convenient and efficient solution that only requires tracing rays that would be projected unobstructed from the scene to the camera without having to compute all possible rays.

In accordance with certain exemplary implementations of the disclosed technology, a ray tracing algorithm may be implemented, to operate on an image made of pixels. For each pixel in the image, a primary ray may be traced into the scene. The direction of that primary ray may be obtained by tracing a line from the camera position to the center of that pixel. Once the primary ray's direction is determined, each object of the scene may be evaluated. An example implementation of a ray tracing algorithm, that may be utilized according to the disclosed technology, is illustrated below:

```
for (int j = 0; j < imageHeight; ++j) {
  for (int i = 0; i < imageWidth; ++i) {
    // compute primary ray direction
    Ray primRay;
    computePrimRay(i, j, &primRay);
    // shoot prim ray in the scene and search for intersection
    Point pHit;
    Normal nHit;
    float minDist = INFINITY;
    Object object = NULL;
    for (int k = 0; k < objects. size( ); ++k) {
      if (Intersect(objects[k], primRay, &pHit, &nHit)) {
        float distance = Distance(eyePosition, pHit);
        if (distance < minDistance) {
          object = objects[k];
          minDistance = distance; //update min distance
        }
      }
    }
    if (object != NULL) {
      // compute illumination
      Ray shadowRay;
      shadowRay.direction = lightPosition – pHit;
      bool isShadow = false;
      for (int k = 0; k < objects.size( ); ++k) {
        if (Intersect(objects[k], shadowRay)) {
          isInShadow = true;
          break;
        }
      }
    }
    if (!isInShadow)
      pixels[i][j] = object->color * light.brightness;
    else
      pixels[i][j] = 0;
    }
}
```

As illustrated above, a ray-tracing algorithm may be implemented using fairly compact code. By combining acceleration schemes with the new technology in computers, it has become easier to use ray-tracing to the point where it has been used in nearly every production rendering software. Other examples of ray-tracing algorithms and various improvements are discussed in https://www.scratchapixel-.com/lessons/3d-basic-rendering/introduction-to-ray-tracing/ray-tracing-practical-example, which is incorporated herein by reference as if presented in full.

Figure 5B:
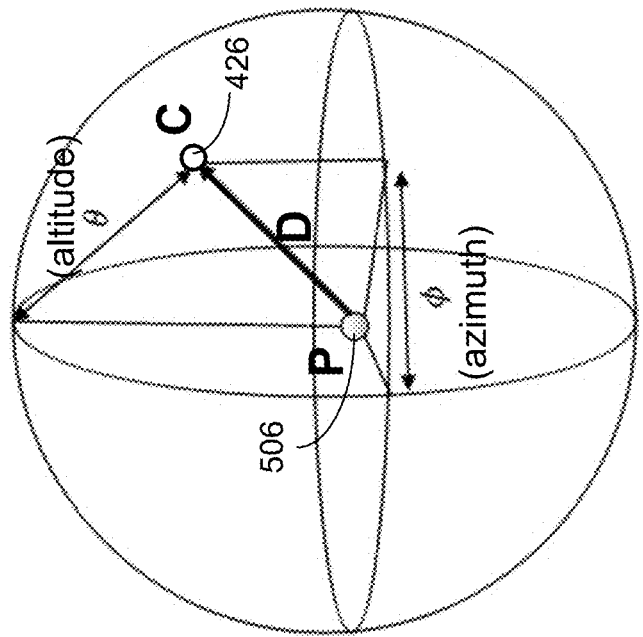
FIG. 5B depicts a step of searching over orientation space to determine a plane vector, in accordance with certain exemplary implementations of the disclosed technology.
Figure 5A:
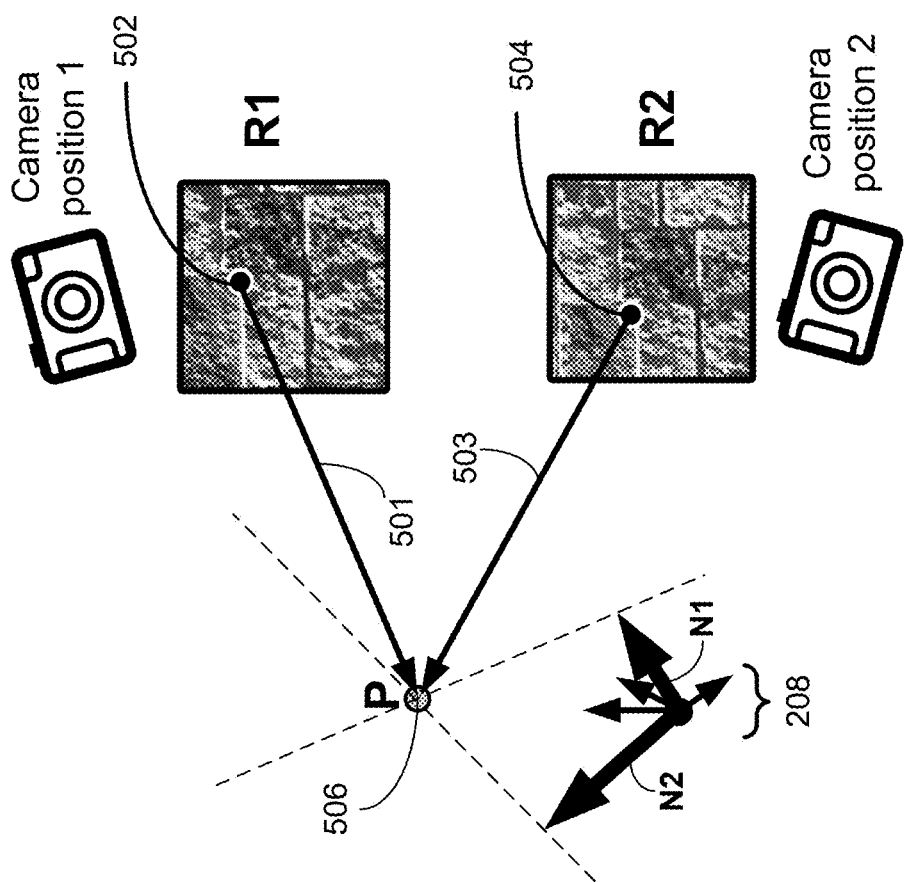
FIG. 5A depicts a process for projecting rays through the pairs of points from the different known image positions to intersect at a world-point P and using P to find candidate plane vectors that intersect P, in accordance with certain exemplary implementations of the disclosed technology.

FIG. 5A depicts a process for projecting rays 501 503 through corresponding pairs of matching points 502 504 from the images R1 and R2 taken in different known image positions to intersect at a world-point P 506 (e.g., on the surface of a wall). In accordance with certain exemplary implementations of the disclosed technology, the world-point P 506 may be utilized to find candidate plane vectors that intersect P 506. FIG. 5A illustrates two example candidate vectors N1 and N2 referenced a local plane coordinate system 208. While only two candidate vectors N1 and N2 are shown (for clarity), in practice, there may be an infinite number of such candidate planes and associated normal vectors. In accordance with certain exemplary implementations of the disclosed technology, each candidate plane may have a unique altitude θ and/or azimuth Φ (as discussed below with reference to FIG. 5B) and an exhaustive search over those two variables (θ, Φ) may be implemented to find the one with the best similarity score for the projections.

In accordance with certain exemplary implementations of the disclosed technology, other matching points (besides or in addition to matching points 502 504) may be used to seed a search for a plane vector. Specifically, since the world positions of the two camera locations are known (or obtained from the AR engine,) the rays 501 503 can be projected through the corresponding matching points 502 504 on both images R1 and R2 to some world point P 506. In certain implementations, this projection may reduce our search to the space of plane vectors N that also contains the point P 506. For example, as shown in FIG. 5A, there are two example candidate planes (out of a possibly infinite number of candidate planes) described by the vectors N1 and N2 which both pass through P 506. By implementing the projection constraint, the 3 degrees of freedom for N can be reduced down to 2 (effectively a search over orientation only) since distance D is fixed by the constraint to intersect matching points 502 504 from the images R1 and R2 to point P 506.

Referring to FIG. 4, FIG. 5A, and FIG. 5B, in accordance with certain exemplary implementations of the disclosed technology, for each candidate N, a local plane coordinate system 208 may be computed, and the center C 426 of R 404 may be determined by expressing P 506 into the candidate N plane's coordinate system. Since the center C 426 of R 404 is uniquely determined for each candidate plane vector N, the only degree of freedom left for R 404 is the size. With this simplification, our search process has been reduced from a 6-dimensional search problem to a 3-dimensional search problem.

In accordance with certain exemplary implementations of the disclosed technology, the search space may be reduced further by setting the size of R 404 to a fixed value. In practice, when computing the similarity metric S 424, generally no improvements are seen when using patches greater than about 128×128 pixels. Thus, in certain implementations, the size of R 404 may be set such that when projected onto Image 1 and Image 2, the average size of the projected regions R1 and R2 (specifically their bounding boxes since in general R1 and R2 will not be rectangular) average to 128 pixels on a side. Thus, with R 404 fully specified for each candidate N, and the length of N being fixed by the constraint that we intersect P 503, the search may be reduced to a 2-dimensional search in the space of orientations of N, specifically, an angular search along altitude θ and/or azimuth Φ.

FIG. 5B depicts orientation space that may be searched over altitude θ and/or azimuth Φ to determine a plane vector, in accordance with certain exemplary implementations of the disclosed technology. Even though the search space is 2-dimensional, it still may not be non-trivial. For each (θ, Φ) combination, a homography for the region R 404 may be computed, and the projections R1w 414 and R2w 416 from Image 1 and Image 2 may be sampled. This is a pixel-heavy operation, but one that is well-suited for GPU acceleration.

In accordance with certain exemplary implementations of the disclosed technology, a high-level procedure (using the above-referenced details) may be used for finding a plane vector N0 and a seed point P0 which lies in the plane N0 from a pair of images:
1. Take Image 1 and Image 2 with known camera locations Camera 1 and Camera 2;
2. Perform point matching between Image 1 and Image 2;
3. Select (preferably strongest) matching points from Image 1 and Image 2;
4. With the selected point match, triangulate to find a seed point P;
5. Exhaustively search the possible plane orientations (θ, Φ);
    a. For each (θ, Φ) compute a similarity score S;
    b. If S>0.9 say that a plane exists at the orientation (θ, Φ) and at a distance D to intersect P, output the corresponding plane vector N, and stop the search.
6. If no match is found, select different matching points and go to Step 4.

In accordance with certain exemplary implementations of the disclosed technology, the positions of Camera 1 and Camera 2 may not be accurately known, which may cause the point P0 to not lie exactly against the plane we are detecting. In order to maximize accuracy, a refinement step may be performed after step 5 above, in which a numerical optimizer may be used to search over the 5-dimensional space of N and P starting at an initial state (N0, P0) to improve the similarity metric S. In accordance with certain exemplary implementations of the disclosed technology, an optimizer implementing the Broyden-Fletcher-Goldfarb-Shanno (BFGS) algorithm, for example, may be utilized and using an objective function to compute S each for each (N, P) evaluated. In certain exemplary implementations, this refinement procedure may provide meaningful changes in the similarity metric S for very small patches or selected areas of the plane vector N because the evaluation of the similarity metric involves a product over all the information in the pixel values of the two patches R1w and R2w. Thus, by using raw pixel data, more data points may be used for optimization, enabling a higher degree of final accuracy.

In some embodiments, the search may be eliminated for certain planes to a manually indicated region or specified class by limiting the space of the exhaustive search (step 5) and/or the refinement procedures. For example, a simplified search for vertical walls only may be accomplished by setting θ to zero and performing the search only over Φ.

Figure 6:
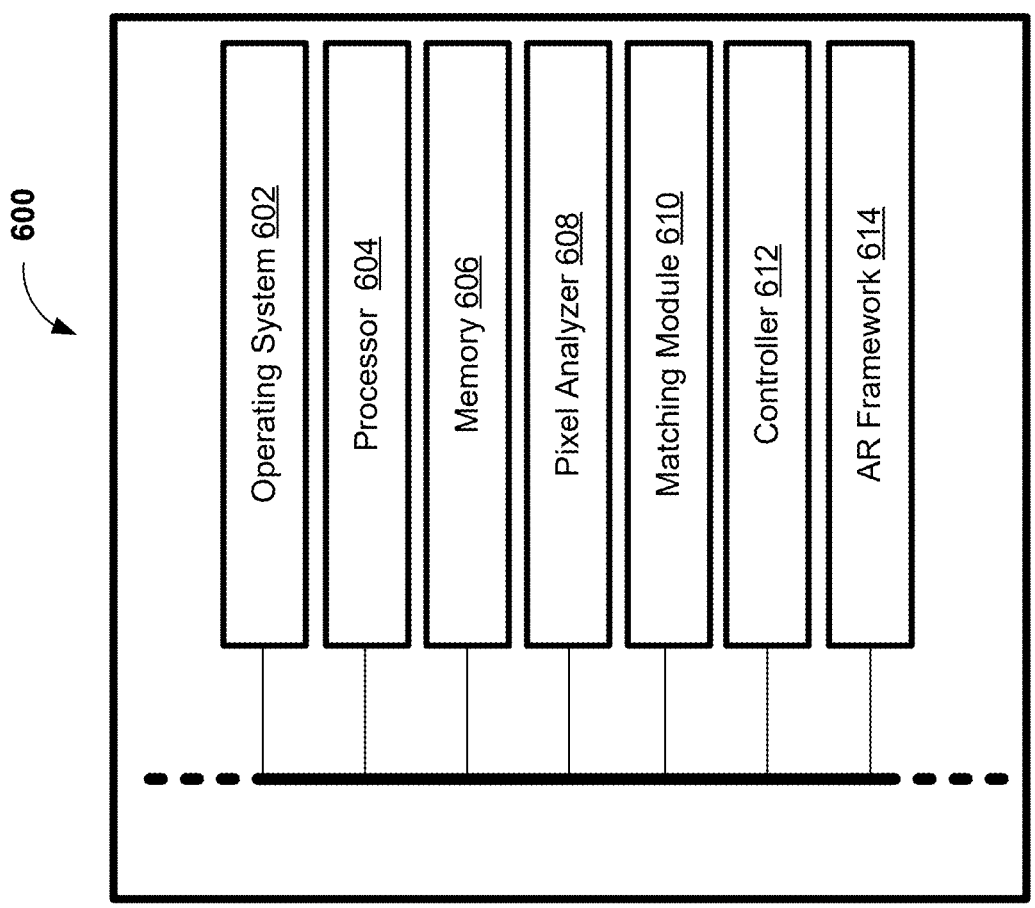
FIG. 6 depicts a processing apparatus for processing images for determining plane vectors from images, in accordance with certain exemplary implementations of the disclosed technology.

FIG. 6 shows an example of a hardware platform 600 that can be used to implement certain processes of the disclosed technology. The hardware platform 600 may include an operating system 602, a processor 604 that can execute code to implement a method described herein (e.g., method 800 shown in FIG. 8 or method 900 shown in FIG. 9). The hardware platform 600 may include a memory 606 that may be used to store processor-executable code and/or store data. The hardware platform 600 may further include a pixel analyzer 608 and a matching module 610, which may be configured to implement the planar surface modeling methods described herein. The hardware platform 600 may further include a controller 612. For example, the controller 612 may implement one or more scheduling or routing algorithms.

The hardware platform 600 may also implement an AR framework 614. The AR framework 614 may be normally executed by the operating system 602 rather than any individual computer program executing on the hardware platform 600. The AR framework 614 can integrate (i) digital images that are captured/generated by an image sensor and (ii) outputs produced by one or more sensors in order to determine the location of the hardware platform 600 in 3D space. At a high level, the AR framework 614 may perform motion tracking, scene capturing, and scene processing to establish the spatial position of the hardware platform 600 in real time. Generally, the AR framework 614 is accessible to computer programs executing on the hardware platform 600 via an application programming interface (API). Thus, the hardware platform 600 may be able to readily obtain spatial positions from the AR framework 614 via the API.

In some embodiments, some portion or all of the pixel analyzer 608, the matching module 610, the controller 612, and/or the AR framework 614 may be implemented in the processor 604. In other embodiments, the memory 606 may comprise multiple memories, some of which are exclusively used by the pixel analyzer 608, the matching module 610, the controller 612, and/or AR framework 614.

Figure 7:
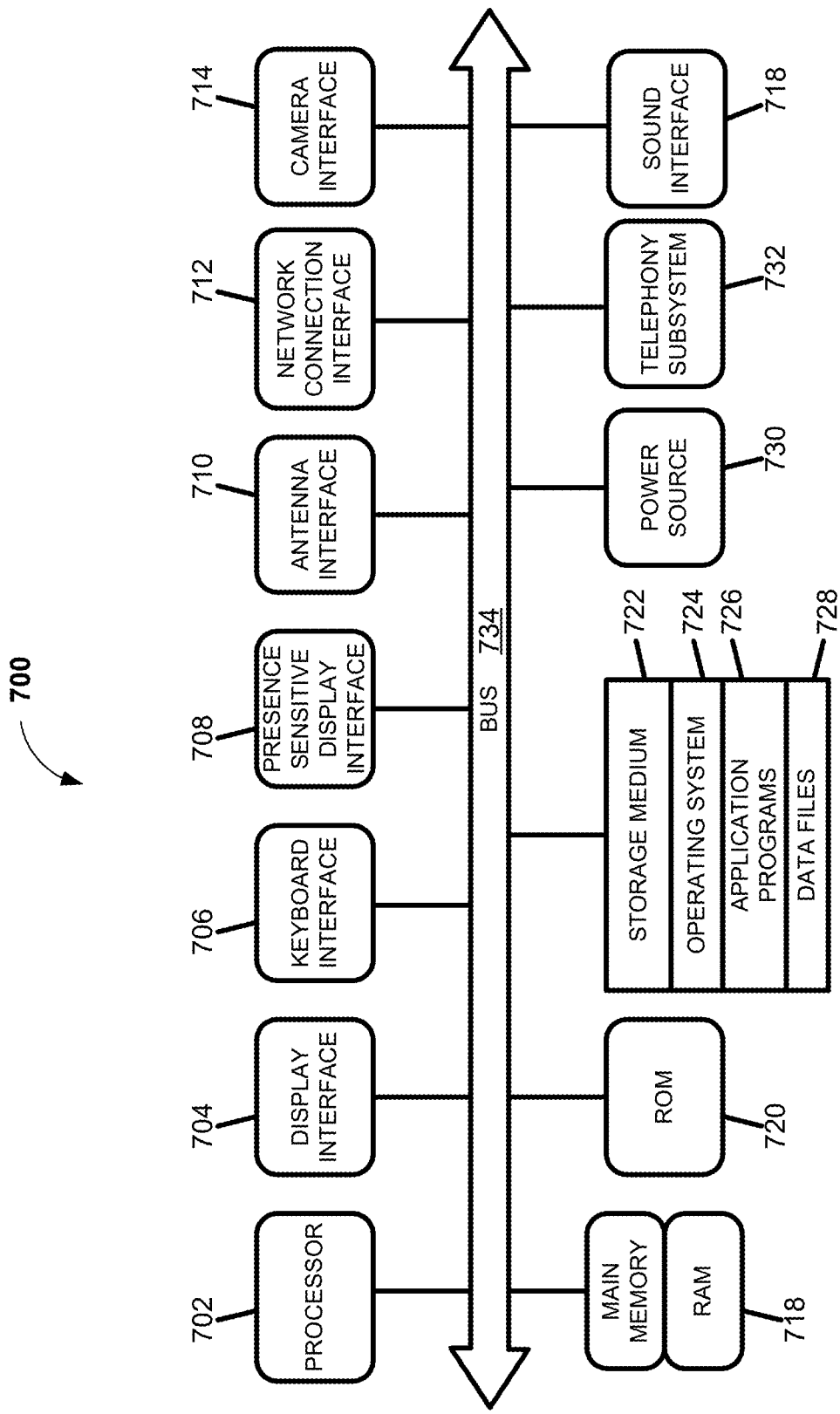
FIG. 7 shows a computer system for processing images for determining plane vectors from images, in accordance with certain exemplary implementations of the disclosed technology.

FIG. 7 depicts a block diagram of an illustrative computing device 700 that may be utilized to enable certain aspects of the disclosed technology. Various implementations and methods herein may be embodied in non-transitory computer-readable media for execution by a processor. It will be understood that the computing device 700 is provided for example purposes only and does not limit the scope of the various implementations of the communication systems and methods.

The computing device 700 of FIG. 7 includes one or more processors where computer instructions are processed. The computing device 700 may comprise the processor 702, or it may be combined with one or more additional components shown in FIG. 7. In some instances, a computing device may be a processor, controller, or central processing unit (CPU). In yet other instances, a computing device may be a set of hardware components.

The computing device 700 may include a display interface 704 that acts as a communication interface and provides functions for rendering video, graphics, images, and texts on the display. In certain example implementations of the disclosed technology, the display interface 704 may be directly connected to a local display. In another example implementation, the display interface 704 may be configured for providing data, images, and other information for an external/remote display. In certain example implementations, the display interface 704 may wirelessly communicate, for example, via a Wi-Fi channel or other available network connection interface 712 to the external/remote display.

In an example implementation, the network connection interface 712 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 704 may be operatively coupled to a local display. In another example, the display interface 704 may wirelessly communicate, for example, via the network connection interface 712 such as a Wi-Fi transceiver to the external/remote display.

The computing device 700 may include a keyboard interface 706 that provides a communication interface to a keyboard. According to certain example implementations of the disclosed technology, the presence-sensitive display interface 708 may provide a communication interface to various devices such as a pointing device, a touch screen, etc.

The computing device 700 may be configured to use an input device via one or more of the input/output interfaces (for example, the keyboard interface 706, the display interface 704, the presence-sensitive display interface 708, the network connection interface 712, camera interface 714, sound interface 716, etc.,) to allow a user to capture information into the computing device 700. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 700 or may be a separate device. For example, the input device may be an accelerometer, a magnetometer, a digital camera, a microphone, and an optical sensor.

Example implementations of the computing device 700 may include an antenna interface 710 that provides a communication interface to an antenna; a network connection interface 712 that provides a communication interface to a network. According to certain example implementations, the antenna interface 710 may utilize to communicate with a Bluetooth transceiver.

In certain implementations, a camera interface 714 may be provided that acts as a communication interface and provides functions for capturing digital images from a camera. In certain implementations, a sound interface 716 is provided as a communication interface for converting sound into electrical signals using a microphone and for converting electrical signals into sound using a speaker. According to example implementations, random-access memory (RAM) 718 is provided, where computer instructions and data may be stored in a volatile memory device for processing by the CPU 702.

According to an example implementation, the computing device 700 includes a read-only memory (ROM) 720 where invariant low-level system code or data for basic system functions such as basic input and output (I/O), startup, or reception of keystrokes from a keyboard are stored in a non-volatile memory device. According to an example implementation, the computing device 700 includes a storage medium 722 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 724, application programs 726 (including, for example, a web browser application, a widget or gadget engine, and or other applications, as necessary) and data files 728 are stored. According to an example implementation, the computing device 700 includes a power source 730 that provides an appropriate alternating current (AC) or direct current (DC) to power components. According to an example implementation, the computing device 700 includes a telephony subsystem 732 that allows the device 700 to transmit and receive sound over a telephone network. The constituent devices and the CPU 702 communicate with each other over a bus 734.

In accordance with an example implementation, the CPU 702 has an appropriate structure to be a computer processor. In one arrangement, the computer CPU 702 may include more than one processing unit. The RAM 718 interfaces with the computer bus 734 to provide quick RAM storage to the CPU 702 during the execution of software programs such as the operating system application programs, and device drivers. More specifically, the CPU 702 loads computer-executable process steps from the storage medium 722 or other media into a field of the RAM 718 to execute software programs. Data may be stored in the RAM 718, where the data may be accessed by the computer CPU 702 during execution. In one example configuration, the device 700 includes at least 128 MB of RAM, and 256 MB of flash memory.

The storage medium 722 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 700 to access computer-executable process steps, application programs, and the like, stored on removable and non-removable memory media, to off-load data from the device 700 or to upload data onto the device 700. A computer program product, such as one utilizing a communication system may be tangibly embodied in storage medium 722, which may comprise a machine-readable storage medium.

According to one example implementation, the term computing device, as used herein, may be a CPU, or conceptualized as a CPU (for example, the CPU 702 of FIG. 7). In this example implementation, the computing device (CPU) may be coupled, connected, and/or in communication with one or more peripheral devices.

Figure 8:
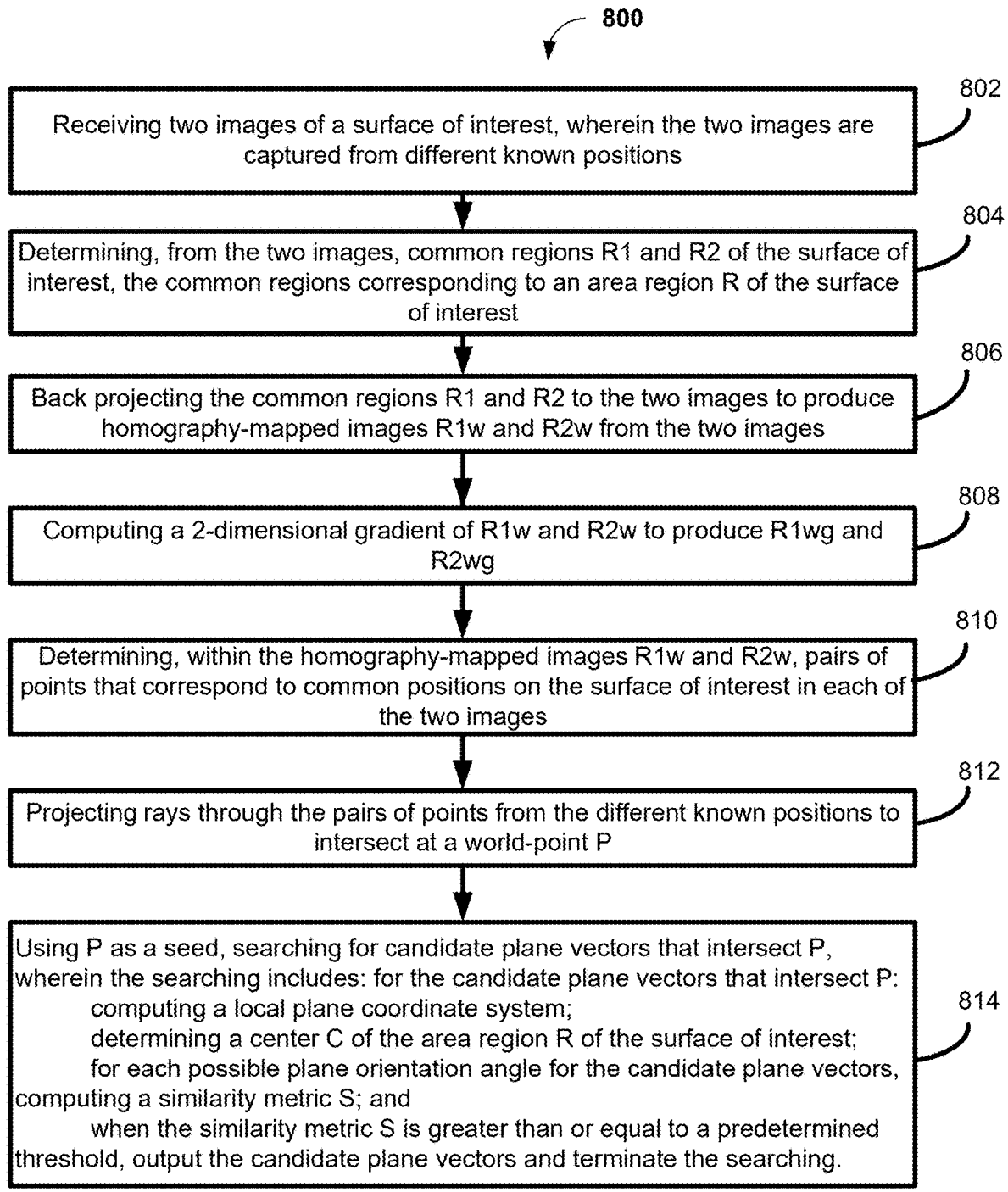
FIG. 8 is a flow diagram of an example method according to certain embodiments of the disclosed technology.

FIG. 8 is a flow diagram of a method 800 for modeling a surface of interest using direct plane fitting to find planes, according to certain embodiments of the disclosed technology. In block 802, the method 800 includes receiving two images of a surface of interest, wherein the two images are captured from different known positions. In block 804, the method 800 includes identifying, from the two images, common regions R1 and R2 of the surface of interest, the common regions corresponding to an area region R of the surface of interest. In block 806, the method 800 includes back-projecting the common regions R1 and R2 to the two images to produce homography-mapped images R1$w$ and R2$w$ from the two images. In block 808, the method 800 includes computing a 2-dimensional gradient of R1$w$ and R2$w$ to produce R1$wg$ and R2$wg$. In block 810, the method 800 includes locating, within the homography-mapped images R1$w$ and R2$w$, pairs of points that correspond to common positions on the surface of interest in each of the two images. In block 812, the method 800 includes projecting rays through the pairs of points from the different known positions to intersect at a world-point P. In block 814, the method 800 includes using P as a seed, searching for a candidate plane vector N that intersects P, wherein the searching comprises: for each the candidate plane vector N that intersects P: computing a local plane coordinate system; determining a center C of the area region R of the surface of interest; for each possible plane orientation angle for the candidate plane vectors, computing a similarity metric S; and when the similarity metric S is greater than or equal to a predetermined threshold, output the candidate plane vectors and terminate the searching.

In certain exemplary implementations, when the similarity metric S is less than the predetermined threshold, the method can include locating, within the homography-mapped images R1$w$ and R2$w$, new pairs of points that correspond to common positions on the surface of interest in each of the two images, projecting rays through the new pairs of points from the different known positions to intersect at a new world-point nP, using nP as a seed, and searching for candidate plane vectors that intersect nP. In certain exemplary implementations, the searching can include, for each of the candidate plane vectors that intersect nP: computing a local plane coordinate system, determining a center C of the area region R of the surface of interest, for each possible plane orientation angle for the candidate plane vectors, and computing a similarity metric S. When the similarity metric S is greater than or equal to a predetermined threshold, the method can include outputting the candidate plane vectors and terminate the searching. When the similarity metric S is less than the predetermined threshold, repeat the search with additional new pairs of points.

Certain exemplary implementations of the disclosed technology can include determining a distance D from the world-point P to C for each candidate plane vectors N that intersects P.

In certain exemplary implementations, the searching for possible plane orientations for the candidate plane vectors can include computing, for each possible plane orientation angle, a homography for the area region R; and sampling projections of R1$w$ and R2$w$ from the received two images.

Certain exemplary implementations of the disclosed technology can further include setting the size of the area region R of the surface of interest to a fixed value. In some exemplary implementations, the fixed value can be 128×128 pixels. In certain exemplary implementations, the fixed value can be 64×64 pixels. In certain exemplary implementations, the fixed value can be 256×256 pixels.

According to an exemplary implementation of the disclosed technology, determining the center of the area portion of the surface of interest can include expressing P into the local plane coordinate system.

In certain exemplary implementations, the similarity metric S may be computed based on a normalized dot product of R1$wg$ and R2$wg$.

In accordance with certain exemplary implementations of the disclosed technology, two or more images may be captured from different known relative positions and orientations.

In certain exemplary implementations, the common regions comprise a fixed size. For example, the fixed size of the common regions can be 128 pixels or less on a side. In some implementations, the fixed size of the common regions can be 256 pixels or less on a side.

In certain exemplary implementations, the possible plane orientation angles can include altitude ($\theta$) and azimuth ($\Phi$). In other exemplary implementations, the possible plane orientation angle comprises altitude ($\theta$) or azimuth ($\Phi$).

Figure 9:
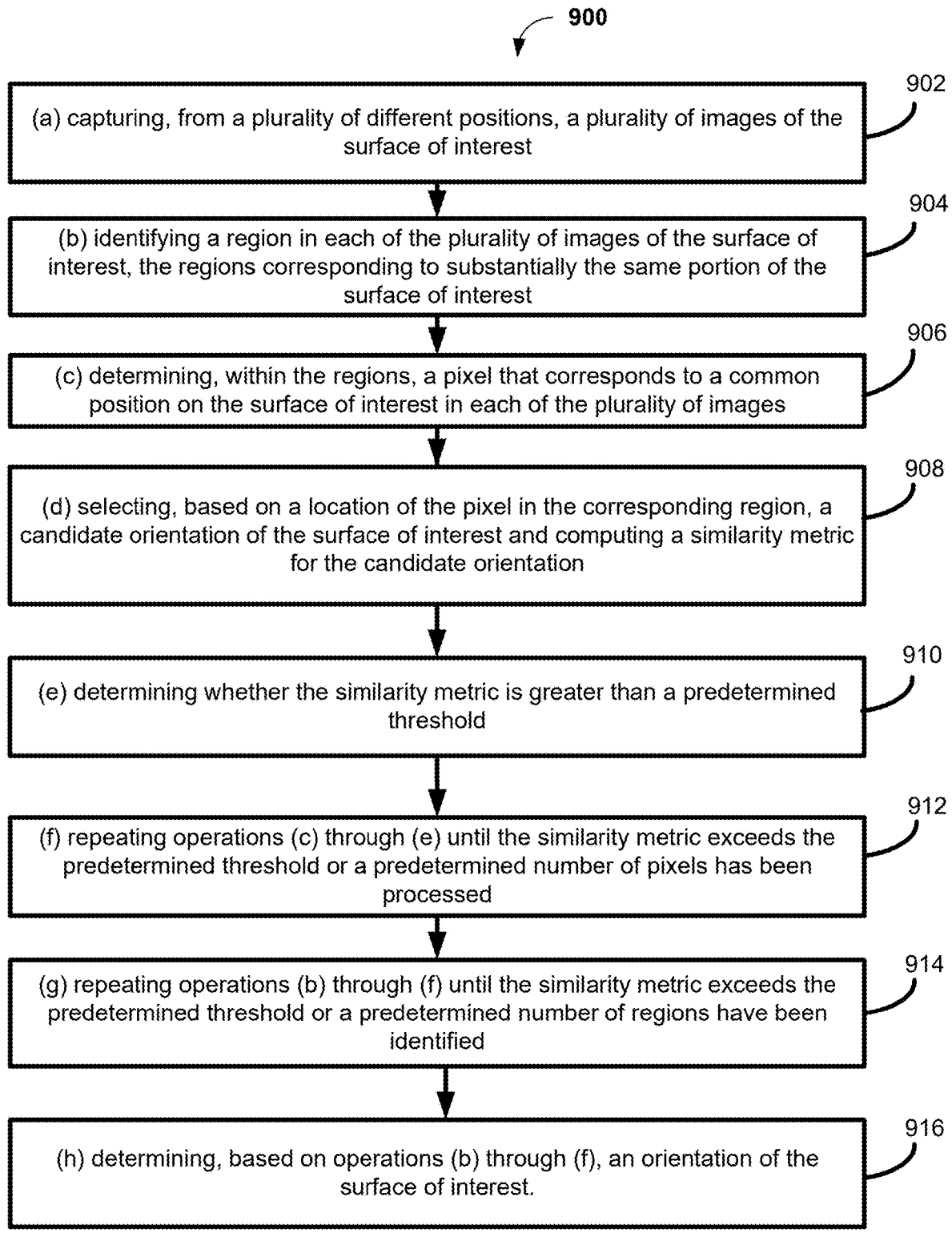
FIG. 9 is a flow diagram of another example method according to certain embodiments of the disclosed technology.

FIG. 9 is a flow diagram of a method 900 for modeling a surface of interest, according to certain embodiments of the disclosed technology. In block 902, the method 900 includes (a) capturing, from a plurality of different positions, a plurality of images of the surface of interest. In block 904, the method 900 includes (b) identifying a region in each of the plurality of images of the surface of interest, the regions corresponding to substantially the same portion of the surface of interest. In some embodiments, substantially the same portion of the surface of interest may correspond to overlapping portions of the surface of interest. In other embodiments, it may correspond to partially-overlapping portions of the surface of interest. In block 906, the method 900 includes (c) determining, within the regions, a pixel that corresponds to a common position on the surface of interest in each of the plurality of images. In block 908, the method 900 includes (d) selecting, based on a location of the pixel in the corresponding region, a candidate orientation of the surface of interest and computing a similarity metric for the candidate orientation. In block 910, the method 900 includes (e) determining whether the similarity metric is greater than a predetermined threshold. In block 912, the method 900 includes (f) repeating operations (c) through (e) until the similarity metric exceeds the predetermined threshold or a predetermined number of pixels has been processed. In block 914, the method 900 includes (g) repeating operations (b) through (f) until the similarity metric exceeds the predetermined threshold or a predetermined number of regions have been identified. In block 912, the method 900 includes (h) determining, based on operations (b) through (f), an orientation of the surface of interest.

In certain exemplary implementations, the method can include determining a relative pose of a camera corresponding to each of the plurality of different positions, wherein the orientation of the surface of interest is further based on the relative pose of the camera.

In certain exemplary implementations, the region comprises a square region that is specified based on a center coordinate of the square region and the width of the square region. In some implementations, the width of the square region is 128 pixels.

In accordance with certain exemplary implementations of the disclosed technology, identifying the region may utilize an optical flow method or a deep-learning-based approach.

In certain exemplary implementations, the surface of interest is a planar surface or a substantially planar surface.

Implementations of the subject matter and the functional operations described herein may be implemented in various systems, digital electronic circuitry, or in computer software, firmware, or hardware, including the structures disclosed herein and their structural equivalents, or in combinations of one or more of them. Implementations of the subject matter described herein can be implemented as one or more computer program products, i.e., one or more modules of computer program instructions encoded on a tangible and non-transitory computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flow described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media, and memory devices, including by way of example semiconductor memory devices, e.g., EPROM, EEPROM, flash memory devices. The processor and the memory can be supplemented by, or incorporated into, special-purpose logic circuitry.

While this disclosure includes many specifics, these should not be construed as limitations on the scope of any invention or of what may be claimed, but rather as descriptions of features that may be specific to particular embodiments of particular inventions. Certain features that are described in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described herein should not be understood as requiring such separation in all embodiments.

What is claimed:
1. A computer-implemented method for modeling a surface of interest using direct plane fitting to find planes, the method comprising:
receiving two images of a surface of interest, wherein the two images are captured by a camera from different known positions;

determining, from the two images, common regions R1 and R2 of the surface of interest, the common regions corresponding to an area region R of the surface of interest;

back projecting the common regions R1 and R2 to the two images to produce homography-mapped images R1w and R2w from the two images;

computing a 2-dimensional gradient of R1w and R2w to produce R1wg and R2wg;

determining within the homography-mapped images R1w and R2w, pairs of points that correspond to common positions on the surface of interest in each of the two images;

projecting, rays through the pairs of points from the different known positions to intersect at a world-point P;

using P as a seed, searching for candidate plane vectors that intersect P, wherein the searching comprises:
for candidate plane vectors that intersect P:
computing a local plane coordinate system;
determining a center C of the area region R of the surface of interest;
for each possible plane orientation angle for the candidate plane vectors, computing a similarity metric S; and
when the similarity metric S is greater than or equal to a predetermined threshold, output the candidate plane vectors and terminate the searching;

determining an orientation of a planar surface based on maximizing the similarity metric S over different portions of the area region R of the surface of interest; and generating a 3D model based on the orientation of the planar surface.

2. The method of claim 1, further comprising:
when the similarity metric S is less than the predetermined threshold:
determining, within the homography-mapped images R1w and R2w, new pairs of points that correspond to common positions on the surface of interest in each of the two images;
projecting rays through the new pairs of points from the different known positions to intersect at a new world-point nP;
using nP as a seed, searching for candidate plane vectors that intersect nP, wherein the searching comprises:
for each candidate plane vector that intersects nP:
computing a local plane coordinate system;
determining a center C of the area region R of the surface of interest;
for each possible plane orientation angle for the candidate plane vectors, compute a similarity metric S;
when the similarity metric S is greater than or equal to a predetermined threshold, outputting the candidate plane vectors and terminate the searching; and
when the similarity metric S is less than the predetermined threshold, repeating the searching with additional new pairs of points.

3. The method of claim 1, further comprising: for each of the candidate plane vectors that intersect P, determining a distance D from the world-point P to C.

4. The method of claim 1, wherein searching possible plane orientations for the candidate plane vectors comprises:
computing, for each possibly plane orientation angle, a homography for the area region R; and sampling projections of R1w and R2w from the received two images.

5. The method of claim 1, further comprising setting a size of the area region R of the surface of interest to a fixed value.

6. The method of claim 5, wherein the fixed value is 128×128 pixels.

7. The method of claim 1, wherein determining the center of the area region R of the surface of interest comprises expressing P into the local plane coordinate system.

8. The method of claim 1, wherein the similarity metric S is computed based on a normalized dot product of R1wg and R2wg.

9. The method of claim 1, wherein the two images are captured from different known relative positions and orientations.

10. The method of claim 1, wherein the common regions comprise a fixed size.

11. The method of claim 10, wherein the fixed size of the common regions is 128 pixels or less on a side.

12. The method of claim 1, wherein the possible plane orientation angle comprises altitude ($\theta$) and azimuth ($\Phi$).

13. The method of claim 1, wherein the possible plane orientation angle comprises altitude ($\theta$) or azimuth ($\Phi$).

14. A computer-implemented method for modeling a surface of interest, comprising:
(a) capturing, by a camera, from a plurality of different positions, a plurality of images of the surface of interest;
(b) identifying a region in each of the plurality of images of the surface of interest, the regions corresponding to substantially the same portion of the surface of interest;
(c) determining, within the regions, a pixel that corresponds to a common position on the surface of interest in each of the plurality of images;
(d) automatically selecting based on a location of the pixel in the regions, a candidate orientation of the surface of interest and computing a similarity metric for the candidate orientation;
(e) determining whether the similarity metric is greater than a predetermined threshold;
(f) repeating operations (c) through (e) until the similarity metric exceeds the predetermined threshold or a predetermined number of pixels has been processed;
(g) repeating operations (b) through (f) until the similarity metric exceeds the predetermined threshold or a predetermined number of regions have been identified;
(h) determining, based on operations (b) through (f), an orientation of the surface of interest; and
(i) generating a 3D model based on the orientation of the surface of interest.

15. The method of claim 14, further comprising:
determining a relative pose of a camera corresponding to each of the plurality of different positions, wherein the orientation of the surface of interest is further based on the relative pose of the camera.

16. The method of claim 14, wherein the region comprises a square region that is specified based on a center coordinate of the square region and a width of the square region.

17. The method of claim 16, wherein the width of the square region is 128 pixels.

18. The method of claim 14, wherein identifying the region uses an optical flow method or a deep-learning based approach.

19. The method of any of claim 14, wherein the surface of interest is a planar surface or a substantially planar surface.

20. A non-transitory computer-readable storage medium storing instructions that are configured to cause one or more processors to perform a method of:
  (a) capturing from a plurality of different positions, a plurality of images of a surface of interest;
  (b) identifying a region in each of the plurality of images of the surface of interest, the regions corresponding to substantially the same portion of the surface of interest;
  (c) determining, within the regions, a pixel that corresponds to a common position on the surface of interest in each of the plurality of images;
  (d) selecting based on a location of the pixel in the regions, a candidate orientation of the surface of interest and computing a similarity metric for the candidate orientation;
  (e) determining whether the similarity metric is greater than a predetermined threshold;
  (f) repeating operations (c) through (e) until the similarity metric exceeds the predetermined threshold or a predetermined number of pixels has been processed;
  (g) repeating operations (b) through (f) until the similarity metric exceeds the predetermined threshold or a predetermined number of regions have been identified;
  (h) determining, based on operations (b) through (f), an orientation of the surface of interest; and
  (i) generating a 3D model based on the orientation of the surface of interest.

* * * * *